Patented Apr. 6, 1948

2,438,961

UNITED STATES PATENT OFFICE 2,438,961

GAMMA-ACETYL PIMELIC ACID AND DIESTERS THEREOF

Albert B. Boese, Jr., Pittsburgh, Pa., assignor to Carbide and Carbon Chemicals Corporation, a corporation of New York No Drawing. Application May 29, 1945,
Serial No. 596,587

7 Claims. (Cl. 260—483)

This invention relates to diesters of γ-acetyl pimelic acid, and to a novel method for producing such esters from adducts of acrylonitrile and β-diketones. Many of these esters have properties rendering them useful as plasticizers for vinyl resins and other resinous plastics, cellulose esters and ethers, and other materials. One feature of the invention concerns the production of 3,3'-dicyanoethyl alkanediones-2,4, which are valuable intermediate compounds useful in the production of esters of γ-acetyl pimelic acid. The invention has especial utility for the production of the higher dialkyl, diaryl, dialkoxyalkyl and diaryloxyalkyl esters of γ-acetyl pimelic acid from adducts of acrylonitrile and pentanedione-2,4.

According to this invention, a 2,4-diketone having a reactive methylene group connecting the carbon atoms of the respective keto groups is condensed with acrylonitrile, in the presence of a basic condensation catalyst. Under such conditions 2 mols of the acrylonitrile condense with 1 mol of the diketone to form a 3,3'-dicyanoethyl dione-2,4. The reaction mixture is then cooled and the resultant dicyanoethyl dione present therein is separated as a crystalline solid by filtration. It may then be washed with water, or otherwise purified.

The condensation reaction may be carried out by adding the catalyst to a stoichiometric mixture of the reactants but, under these conditions, the exothermic nature of the reaction makes the control thereof somewhat difficult. More satisfactory results are secured by introducing a mixture of the reactants into a liquid diluent containing the catalyst, which diluent preferably is substantially inert to acrylonitrile. Secondary alcohols such as isopropanol, and tertiary alcohols such as tertiary butanol, are eminently suitable as diluents; although other inert diluents such as the aromatic hydrocarbons; the aliphatic ethers such as diethyl ether and dioxane; and chlorinated solvents such as chlorinated hydrocarbons and ethers may be effectively employed.

The acrylonitrile also may be added to a solution of the diketone in the diluent containing the catalyst. However, better yields are generally obtained by adding a stoichiometric mixture of the reactants to the diluent containing the catalyst.

The condensation reaction is preferably conducted at a temperature between around 60° C. and around 100° C., although higher and lower temperatures may be employed. At temperatures much below 60° C. the condensation reaction becomes somewhat sluggish, and a high concentration of unreacted diketone and acrylonitrile may be built up before the condensation is initiated.

Among 2,4-diketones suitable for use in the process may be mentioned acetyl acetone (pentanedione-2,4), propionyl acetone, acetyl isobutyryl methane, acetyl caproyl methane, propionyl acetophenone, benzoyl acetone, etc. Acrylonitrile reacts with these higher diketones to yield the corresponding dicyanoethyl diones. However, the higher diones thus produced have no advantage over the more readily available pentanedione derivatives as intermediates for the production of diesters of 4-acetyl pimelic acid.

The most effective catalysts used in the condensation are strongly basic materials, the more active ones being the alkali metal hydroxides such as sodium and potassium hydroxides, and quaternary organic bases such as trimethyl benzyl ammonium hydroxide and tetraethanolammonium hydroxide. The catalyst usually is employed in the form of a 40% to 50% aqueous solution.

The condensation reaction may be represented by the following equation:

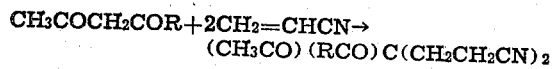

$$CH_3COCH_2COR + 2CH_2=CHCN \rightarrow (CH_3CO)(RCO)C(CH_2CH_2CN)_2$$

wherein R represents either an alkyl or an aryl group containing from 1 to 12 carbon atoms. The resultant product may be defined as a γ-diacyl pimelonitrile wherein at least one acyl group is the acetyl group.

The 3,3'-dicyanoethyl dione-2,4 formed in the aforesaid condensation does not, upon hydrolysis with mineral acids or with alkali metal hydroxides, yield the expected diacyl pimelic acids, but, instead, yields γ-acetyl pimelic acid. During the hydrolysis one acyl group is split off to form the corresponding carboxylic acid. Thus, the hydrolysis of 3,3'-dicyanoethyl pentanedione-2,4 splits off one acetyl group as acetic acid.

The γ-acetyl pimelic acid formed is a water-soluble, non-crystalline compound whose isolation from the hydrolysis reaction mixture requires repeated and tedious extractions with a solvent such as diethyl ether.

According to a preferred form of the present invention, the 3,3'-dicyanoethyl alkanedione-2,4 is directly converted to a dialkyl, diaryl, dialkoxyalkyl or diaryloxyalkyl ester of γ-acetyl pimelic acid by a simultaneous hydrolysis and esterification which has proven to be highly efficient. This result is readily accomplished by heating the 3,3'-dicyanoethyl alkanedione-2,4 in the presence of an hydrolysis and esterification catalyst such as sulfuric acid, with a monohydric aliphatic or aromatic alcohol, a monoalkyl or monoaryl ether of a mono- or polyalkylene glycol having the desired terminal alkyl or alkoxyalkyl group, or a dialkyl ether of glycerol. Among suitable esterifying agents may be mentioned the saturated aliphatic monohydric alcohols such as methanol, butanol, hexanol, 2-ethylhexanol, decanol, and the higher alcohols; aromatic alcohols such as benzyl alcohol; the monoalkyl and monoaryl ethers of glycols such as the monoethyl and monophenyl ethers of ethylene glycol and of diethylene glycol; and glycerol dimethyl ether.

Esterifying agents that provide esters having alkyl groups or aryl groups containing at least 6 carbon atoms, or having alkoxyalkyl or aryloxyalkyl groups containing at least 3 carbon atoms, are preferred, since the resultant 4-acetyl pimelic acid diesters appear to possess valuable properties adapting them for use as plasticizers for thermoplastic resinous materials such as the various vinyl resins.

The concurrent hydrolysis and esterification reactions preferably are conducted at temperatures ranging from about 60° C. to about 150° C. When treating a dicyanoethyl alkanedione-2,4, during the reaction one acyl group of the dicyanoethyl alkanedione is split off and recovered in the form of an ester of a fatty acid. The reaction involved may be generally represented by the following equation:

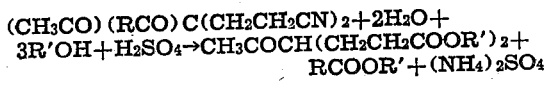

wherein R represents an alkyl group containing between 1 and 12 carbon atoms or an aryl group containing not more than 12 carbon atoms; and R' is a radical selected from the class consisting of the alkyl radicals, the aryl radicals, the alkoxyalkyl radicals, and the aryloxyalkyl radicals.

By subjecting the aforesaid dicyanoethyl diones-2,4 concurrently to hydrolysis and esterification reactions in the presence of aliphatic alcohols and alcohol ethers, it is possible to produce directly from the dicyanoethyl diones, in simple manner and in good yields, the diesters of γ-acetyl pimelic acid with even the higher alkyl alcohols and alcohol ethers such as hexanol, 2-ethylhexanol, the decanols, the tetradecanols, and the monoethyl and monobutyl ethers of ethylene glycol and of the polyethylene glycols.

It will be understood that the γ-acetyl pimelic acid esters of the higher alcohols and alcohol ethers can also be produced somewhat less conveniently by an ester exchange reaction between such alcohol or alcohol ether and the dimethyl or diethyl ester of γ-acetyl pimelic acid, catalyzed with an acid such as sulfuric acid.

The following examples serve to illustrate the invention:

*Example I.—3,3'-di(cyanoethyl) pentanedione-2,4*

During a period of one hour, a mixture of 100 grams (1 mol) of pentanedione-2,4 and 106 grams (2 mols) of acrylonitrile were introduced in successive portions into 400 cc. of refluxing isopropanol containing 1 cc. of a 50% aqueous solution of potassium hydroxide. During this period an additional 9 cc. of catalyst were added at equally spaced intervals. After refluxing for an additional hour, the reaction mixture was cooled to 10° C., and the solid crystalline product which had formed was separated by filtration, washed with water and air dried. A yield of over 76% of 3,3'-dicyanoethyl pentanedione-2,4 was secured in the form of colorless crystals melting at 182° C.–184° C.

*Example II. — 3,3-di(cyanoethyl) 3''-benzoyl acetone*

During two hours a solution of 75 grams (0.46 mol) of benzoyl acetone and 49 grams (0.92 mol) of acrylonitrile in 200 cc. of isopropanol were added slowly with stirring to a refluxing solution of 200 cc. of isopropanol containing 2 cc. of a 50% aqueous potassium hydroxide solution. During this period an additional 3 cc. of the potassium hydroxide solution were added, and refluxing was continued for an additional two hours. The isopropanol was then distilled off, 200 cc. of water were added to the residue, the mixture was extracted with benzene, and the benzene extract washed with water. Upon fractional distillation of the washed extract under subatmospheric pressure after removal of the benzene, there was secured a yield of 65% of dicyanoethyl benzoyl acetone, in the form of a pale yellow oil boiling at from 175° C. to 178° C. under an absolute pressure of 2.5 mm. of mercury. It had a specific gravity of 1.1128 at 20°/20° C.; and a refractive index, 20/D of 1.5365

*Example III.—γ-acetyl di(2-ethylhexyl) pimelate*

A mixture of 25 grams of 3,3'-di(cyanoethyl) pentanedione-2,4, 100 grams of 2-ethylhexanol-1, and 29 grams of an 83% aqueous solution of sulfuric acid were heated for eighteen hours at 130° C.–140° C. in an open vessel. The resultant dark red liquid was washed with water to remove sulfuric acid and ammonium sulfate, and was fractionally distilled under subatmospheric pressure. After removal of the excess 2-ethylhexanol and the 2-ethylhexyl acetate which had been formed, γ-acetyl di-(2-ethylhexyl) pimelate was obtained in a yield of over 87%, based upon the dicyanoethyl pentanedione employed. This novel compound is a pale, straw-colored liquid boiling between 235° C. and 240° C. under an absolute pressure of 4 mm. of mercury. It has a specific gravity of 0.9656 at 20°/4° C.; and a refractive index at 20° C. of 1.4555.

*Example IV.—γ-acetyl di-(butoxyethyl) pimelate*

A mixture of 100 grams of butoxyethanol, 25 grams of concentrated sulfuric acid and 25 grams of 3,3'-dicyanoethyl pentanedione-2,4 was heated on a steam bath for forty hours. The resultant dark red solution was washed with water to remove sulfuric acid and ammonium sulfate. The washed solution was fractionally distilled under vacuum, and the γ-acetyl di-(butoxyethyl) pimelate was recovered in a yield around 77%, after removal and recovery of unreacted butoxyethanol and some butoxyethyl acetate.

The γ-acetyl di(butoxyethyl) pimelate, or di-(β-butoxyethyl) ester of γ-acetyl pimelic acid, is a pale yellow liquid boiling at from 205° C. to 215° C. under an absolute pressure of between 1.5 and 2 mm. of mercury. It has a specific gravity at 20°/4° C. of 1.0237; and has a refractive index at 20° C. of 1.4547.

By substituting for the glycol ether recited in Example IV the monophenyl ether of ethylene glycol, the di-phenoxyethyl ester of γ-acetyl pimelic acid may be produced; while by substituting the monobutyl ether of diethylene glycol, the di-(β-butoxy-β'ethoxyethyl) ester of γ-acetyl pimelic acid may be produced.

*Example V.—γ-acetyl diethyl pimelate*

A mixture of 100 cc. of 90% ethanol, 50 cc. of concentrated sulfuric acid, and 33 grams of 3,3'-dicyanoethyl pentanedione-2,4 was refluxed for forty hours under a refluxing head, during which time approximately 1 mol of ethyl acetate was removed by distillation, and ammonium sulfate was formed. The residual mixture then was added to 700 cc. of water, and the oily layer which separated was extracted with ether, and the extract dried over sodium sulfate. After removal of the ether, γ-acetyl diethyl pimelate was obtained in amount corresponding to a yield of 83.3%, based upon the dicyanoethyl pentanedione starting material.

The terms "alcohol," "alcoholic esterifying agent" and similar expressions are used in the claims to designate not only the monohydric aliphatic and aromatic alcohols but also the monoalkyl and monoaryl ethers of the alkylene glycols and of the di- and polyalkylene glycols; and the dialkyl ethers of glycerol, such as glycerol dimethyl ether.

The invention is susceptible of modification within the scope of the appended claims.

I claim:

1. Process which comprises the step of hydrolyzing a γ-diacyl pimelonitrile wherein at least one acyl group is the acetyl group by heating such diacyl pimelonitrile in the presence of moisture and an hydrolysis catalyst, thereby splitting off one acyl group from said pimelonitrile and forming γ-acetyl pimelic acid.

2. Process for producing a diester of γ-acetyl pimelic acid, which comprises hydrolyzing a dicyanoethyl dione-2,4 by heating such dione at a temperature within the range between around 60° C. and around 150° C. in the presence of moisture, alcoholic esterifying agent and an esterification catalyst, thereby concurrently esterifying the acid product of such hydrolysis, and recovering from the esterification reaction mixture the diester of γ-acetyl pimelic acid thus produced.

3. Process for producing a diester of γ-acetyl pimelic acid, which comprises hydrolyzing a dicyanoethyl dione-2,4 by heating such dione in the presence of moisture, an alcoholic esterifying agent and an acidic esterification catalyst, thereby concurrently esterifying the acid product of the hydrolysis, and recovering from the esterification reaction mixture the diester of γ-acetyl pimelic acid thus produced.

4. Process as defined in claim 3, wherein the alcoholic esterifying agent is a monoalkyl ether of an ethylene glycol, and the resultant diester is a dialkoxyalkyl ester of γ-acetyl pimelic acid.

5. Process for producing a diester of γ-acetyl pimelic acid, which comprises hydrolyzing a γ-diacyl pimelodinitrile wherein at least one acyl group is the acetyl radical by heating such dinitrile in the presence of moisture, an alcoholic esterifying agent and an acidic esterification catalyst, thereby concurrently esterifying the acid product of the hydrolysis, and recovering from the esterification reaction mixture the diester of γ-acetyl pimelic acid thus produced.

6. Process for producing diesters of γ-acetyl pimelic acid, which comprises hydrolyzing by heating at an elevated temperature, in the presence of moisture, an alcoholic esterifying agent, and an acidic hydrolysis and esterification catalyst, a dicyanoethyl dione-2,4 having the structure $CH_3CO(RCO)C(CH_2CH_2CN)_2$ wherein R represents a group selected from the class consisting of the alkyl and aryl groups containing from 1 to 12 carbon atoms, thereby hydrolyzing said dione and simultaneously esterifying the hydrolyzed product as formed by means of an alcoholic esterifying agent, and recovering from the resultant reaction mixture the diester of γ-acetyl pimelic acid thus produced.

7. Process for producing diesters of γ-acetyl pimelic acid, which comprises hydrolyzing a dicyanoethyl alkanedione-2,4 at a temperature within the range between around 60° C. and around 150° C., in the presence of moisture and an acidic hydrolysis and esterification catalyst, simultaneously esterifying the hydrolyzed product substantially as rapidly as formed by means of an alcoholic esterifying agent selected from the group consisting of the monohydric alcohols having at least 6 carbon atoms and the alkylene and polyalkylene glycol monoalkyl ethers having at least 3 carbon atoms, and recovering from the resultant reaction mixtures the diester of γ-acetyl pimelic acid thus produced.

ALBERT B. BOESE, Jr.

REFERENCES CITED

The following references are of record in the file of this patent:

UNITED STATES PATENTS

| Number | Name | Date |
|---|---|---|
| 2,374,327 | Bruson | Apr. 24, 1945 |
| 2,381,371 | Shannon | Aug. 7, 1945 |
| 2,383,444 | Bruson | Aug. 28, 1945 |
| 2,386,736 | Bruson | Oct. 9, 1945 |

OTHER REFERENCES

Perkin et al.: Jour. Chem. Soc. (London), vol. 91 (1907), page 1741.

Ser. No. 377,664, Wiest (A. P. C.), published April 20, 1943.